June 28, 1955 — L. J. MISURACA — 2,711,664
BORING HEAD
Filed June 5, 1950
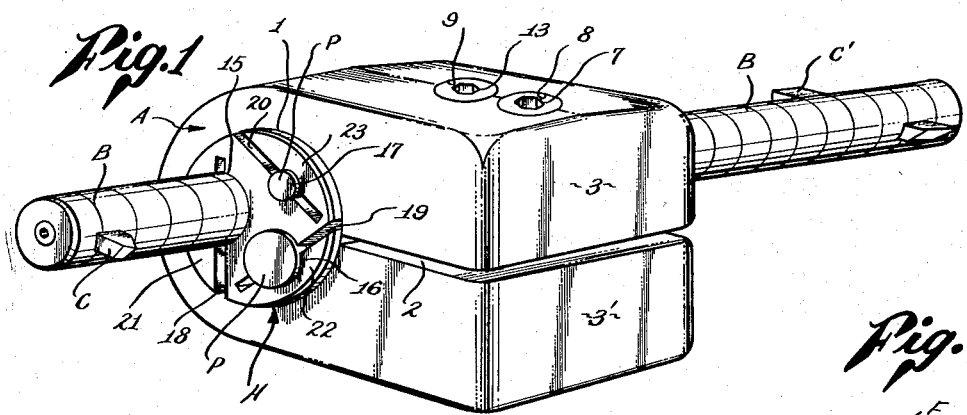
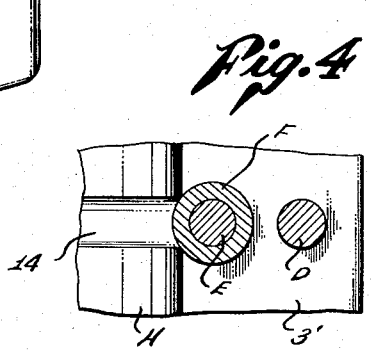
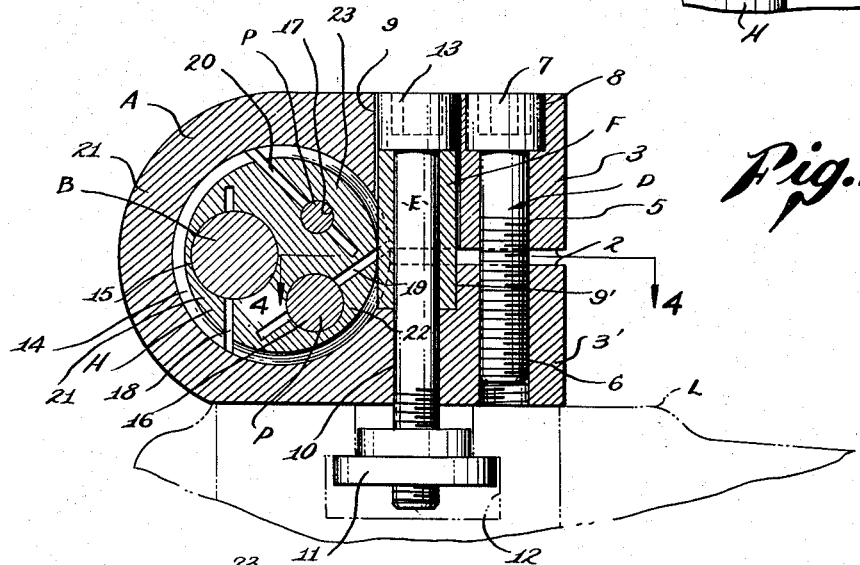
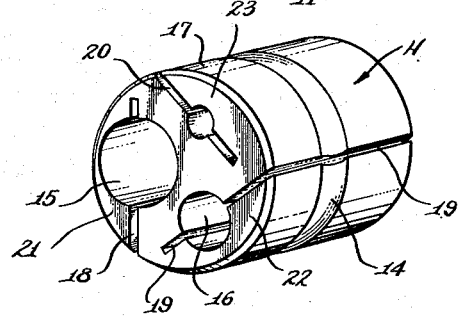
INVENTOR.
LOUIS J. MISURACA
BY Luther L. Mack
Attorney

2,711,664
BORING HEAD

Louis J. Misuraca, Glendale, Calif.

Application June 5, 1950, Serial No. 166,110

1 Claim. (Cl. 82—37)

This invention relates to and has for a broad object the provision of an improved type of boring head adapted to be mounted on the compound of a lathe and embodying means selectively supporting boring bars of different diameter on a single member which is rotatably adjustable in a base block for properly positioning the boring tool for engagement with a piece of work to be bored.

Another object is to provide a split base block bored transversely and a cylindrical boring bar holder rotatably adjustable in the bore of said block and having a plurality of longitudinal bores of different size for adjustably receiving and supporting boring bars of correspondingly different size, one at a time, with an operative bar in one bore and plugs in the other bores, means for clamping the bar holder on the base block and means for clamping the boring head on the compound of a lathe.

I prefer to form the bar holder with chordal slits in the diametrical planes of the bar receiving bores of the holder which are open at different points on the periphery of the holder so that when the furcations of the base block are drawn together the holder will be frictionally held in said block against rotation and at the same time the boring bar and plugs borne by the holder will likewise be clamped securely in the holder by reason of the frictional engagement of the segments outwardly of the slits in the holder.

A further object is to provide a retainer in association with the mounting means for the head which interlocks with and prevents axial movement of the holder in the base block during a boring operation or except when its removal from said block may be desired.

It may be understood that in boring heads heretofore used, the boring bar has been so supported at spaced points and clamped on a base that the bars are to a greater or lesser extent prestressed and axially distorted or misalined, thereby causing a slight wobble of the cutting tool especially when the tool is too remote from the head, and the consequent molecular disturbance results in the "singing" of the boring bar and tends to produce inaccurate results. In order to overcome such conditions I provide a solid and substantial base block and cylindrical holder of such dimensions as to form an elongated bearing for the boring bar to which pressure is applied throughout a substantial length of the boring bar and entirely therearound when the bar is clamped in position for use while yet permitting quick and ready axial and rotative adjustment of a bar in the holder for facilitating and effective adjustment of the cutting tool relative to the work.

Moreover, a selected boring bar and the plugs in the other bores of the holder are simultaneously clamped in the holder by locking the holder in the base block.

Other objects may appear as the description of my improvements progresses.

I have shown a preferred form of boring head structure embodying my improvements in the accompanying drawings, in which:

Fig. 1 is a perspective view of an assembled boring head with a boring bar operatively mounted thereon;

Fig. 2 is a longitudinal sectional elevation of the same in a plane midway between the sides of the head;

Fig. 3 is a perspective view of the boring bar holder detached from its base; and Fig. 4 is a sectional plan on line 4—4 of Fig. 2.

As shown, my structure includes a base block A of substantial width which is transversely bored at 1 to receive a cylindrical holder H arranged to adjustably support a boring bar B of selected size and having one or more cutting tools C or C' thereon. Block A is split at 2 in the horizontal plane of the axis of bore 1 and provides spaced furcations 3 and 3' which are connected by a clamping bolt D extended through a bore 5 of furcation 3 and screwed into a threaded bore 6 of furcation 3', a head 7 of said bolt being seated in a counterbore 8 of furcation 3. Obviously, when bolt D is tight the furcations 3 and 3' will be drawn together for constricting the surface of bore 1 in frictional engagement with the periphery of holder H to hold bar B in operative position.

The boring head is secured in position on the compound L of a lathe by means of a bolt E which extends through a bore 9 in furcation 3 and a coaxial bore 10 in furcation 3'. Bolt 10 is attachable at its lower end to a fixture which is in a channel 12 of compound L. A bushing F is seated in bore 9 of furcation 3 with its lower portion in a counterbore 9' of furcation 3' and the head 13 of bolt E thus holds bushing F in position so that it bears against furcation 3' and peripherally engages an annular groove 14 of holder H to prevent axial movement of the holder in bore 1 of the base A.

Holder H has a plurality of longitudinal bores 15, 16 and 17 of different size for adjustably receiving and supporting boring bars B or plugs P of correspondingly different size, and chordal slits 18, 19 and 20 are formed in the holder in the axial planes of the bores 15, 16 and 17, respectively. Said slits are open at the periphery of holder H and serve to separate segments 21, 22 and 23 from the central portion of the holder so that when pressure is applied to the segments by tightening clamping bolt D a bar B and plugs P, P will be also clamped and frictionally held in the holder. Slits 18, 19 and 20 define the inner boundaries of yieldable segments 21, 22 and 23, respectively and intersect bores 15, 16 and 17.

Attaching bolt D and clamping bolts E preferably have socketed heads for receiving a so called Allen wrench whereby said bolts may be most conveniently and quickly tightened and loosened.

The employment of plugs P in the bores of holder H not occupied by a boring bar B is important because when bolt D is tightened frictional engagement of the entire surface of holder H with the surface of bore 1 is effected by the interposition of the plugs between the central and segmental portions of the holder. Otherwise the friction only adjacent the bar B might not be sufficient to withstand the countereffort of a boring operation.

It is apparent that when the holder is free in bore 1 a bar B may be longitudinally adjusted and extended from the head to a desired extent and the holder may also be rotated in bore 1 to dispose the cutting tool C or C' at a proper elevation or laterally for proper engagement with the work to be bored.

The invention, therefore, broadly consists in the provision of the structural features herein shown and described and specifically in the form, arrangement and relationship of the elements of the head to provide a simple, economical, substantial and readily adjustable boring head capable of meeting all demands of such a unit.

I claim:

A boring head comprising: a base block, a cylindrical holder rotatably adjustable in a bore of said block, said block being slit diametrically of and outwardly from said bore to provide relatively adjustable furcations, an attaching bolt extended through said furcations and adapted to be secured to a fixture of a boring machine, a bushing borne by one furcation and bearing against the other furcation, said bushing being confined between the head of said bolt and the other furcation and peripherally engageable with said holder, said holder having a peripheral groove to receive said bushing, whereby to prevent longitudinal movement of the holder, said holder having a plurality of longitudinal cylindrical bores of different size with axes eccentric to the axis of said holder, a boring bar in a selected bore of the holder, said holder having a separate slit intersecting each said bar receiving bore and defining chordal boundaries of yieldable segments of less than one hundred eighty degrees extent, said slits being open at only one extremity to the periphery of the holder and means for clamping said furcations to retain said holder in adjusted position and to simultaneously constrict said segments against a bar therein and plugs disposed in the longitudinal bores other than said selected bore of the holder to provide uniform tension on all segments and continuous frictional contact of the holder with the block when the furcations are drawn together.

References Cited in the file of this patent

UNITED STATES PATENTS

| | | |
|---|---|---|
| 643,713 | Converse | Feb. 20, 1900 |
| 735,138 | Normand | Aug. 4, 1903 |
| 1,022,760 | Stoecklin | Apr. 9, 1912 |
| 2,540,568 | Clatfelter | Feb. 6, 1951 |

FOREIGN PATENTS

| | | |
|---|---|---|
| 136,081 | Great Britain | Dec. 11, 1919 |